(12) United States Patent
Falk et al.

(10) Patent No.: US 10,798,085 B2
(45) Date of Patent: Oct. 6, 2020

(54) UPDATING OF A DIGITAL DEVICE CERTIFICATE OF AN AUTOMATION DEVICE

(71) Applicant: SIEMENS AKTIENGESELLSCHAFT, Munich (DE)

(72) Inventors: Rainer Falk, Poing (DE); Steffen Fries, Baldham (DE)

(73) Assignee: Siemens Aktiengesellschaft, Munich (DE)

( * ) Notice: Subject to any disclaimer, the term of this patent is extended or adjusted under 35 U.S.C. 154(b) by 252 days.

(21) Appl. No.: 14/778,597

(22) PCT Filed: Mar. 4, 2014

(86) PCT No.: PCT/EP2014/054139
§ 371 (c)(1),
(2) Date: Sep. 20, 2015

(87) PCT Pub. No.: WO2014/146895
PCT Pub. Date: Sep. 25, 2014

(65) Prior Publication Data
US 2016/0057134 A1 Feb. 25, 2016

(30) Foreign Application Priority Data

Mar. 21, 2013 (DE) .................. 10 2013 205 051

(51) Int. Cl.
*G06F 21/00* (2013.01)
*H04L 29/06* (2006.01)
(Continued)

(52) U.S. Cl.
CPC ...... *H04L 63/0823* (2013.01); *G05B 19/0428* (2013.01); *G06F 21/335* (2013.01);
(Continued)

(58) Field of Classification Search
CPC . H04L 63/061; H04L 63/0823; G06F 21/335; G06F 21/44; G06F 21/572; G06F 21/64
See application file for complete search history.

(56) References Cited

U.S. PATENT DOCUMENTS 7,861,085 B1 12/2010 Case et al.
2003/0100297 A1* 5/2003 Riordan ............... G06F 8/60
455/418
(Continued)

FOREIGN PATENT DOCUMENTS

CN 1897524 A 1/2007
CN 1914069 A 2/2007
(Continued)

OTHER PUBLICATIONS

Cooper D. et al: Internet X.509 Public Key Infrastructure Certificate and Certificate Revocation List (CRL) Profile, RFC 5280, ISSN: 0000-0003, XP015057243, 2008.
(Continued)

*Primary Examiner* — Jeffrey C Pwu
*Assistant Examiner* — Thong P Truong
(74) *Attorney, Agent, or Firm* — Lempia Summerfield Katz LLC

(57) ABSTRACT

The invention relates to an automation device (41, 81), a system and a method for updating a digital device certificate (55, 86, 96) of an automation device (41, 81) of an automation system, wherein the automation device (41, 81) is authenticated to an authentication partner by means of at least one device certificate (55, 86, 96). The device certificate (55, 86, 96) is connected to device-specific configuration data of the automation device (41, 81). Following a modification of the configuration of the automation device (41, 81), according to the invention an updated device certificate (55, 86, 96) having device-specific configuration data according to the modified configuration of the automa-
(Continued)

tion device (41, 81) is determined by the automation device (41, 81) and subsequently used for authentication.

18 Claims, 4 Drawing Sheets

(51) Int. Cl.
  *G06F 21/33* (2013.01)
  *G06F 21/64* (2013.01)
  *H04L 9/32* (2006.01)
  *G06F 21/44* (2013.01)
  *G05B 19/042* (2006.01)
  *G06F 21/57* (2013.01)

(52) U.S. Cl.
  CPC ............ *G06F 21/44* (2013.01); *G06F 21/572* (2013.01); *G06F 21/64* (2013.01); *H04L 9/3268* (2013.01); *H04L 63/061* (2013.01); *G05B 2219/24163* (2013.01)

(56) References Cited

U.S. PATENT DOCUMENTS

| | | | |
|---|---|---|---|
| 2006/0047951 A1* | 3/2006 | Reilly | H04L 9/3263 713/158 |
| 2006/0255910 A1 | 11/2006 | Fukushima et al. | |
| 2007/0005980 A1 | 1/2007 | Miyazawa | |
| 2009/0089582 A1 | 4/2009 | Brutch et al. | |
| 2009/0320110 A1* | 12/2009 | Nicolson | |
| 2010/0011225 A1* | 1/2010 | Takayama | G06F 21/57 713/189 |
| 2012/0213366 A1 | 8/2012 | Brown et al. | |
| 2013/0031360 A1 | 1/2013 | Dewitz et al. | |
| 2013/0166899 A1* | 6/2013 | Courtney | G06F 21/53 713/100 |
| 2014/0173688 A1 | 6/2014 | Fischer et al. | |

FOREIGN PATENT DOCUMENTS

| | | |
|---|---|---|
| CN | 101309146 A | 11/2008 |
| CN | 101488170 A | 7/2009 |
| CN | 101535845 A | 9/2009 |
| DE | 102005042563 A1 | 3/2007 |
| DE | 102007014782 A1 | 9/2007 |
| DE | 102011108003 A1 | 1/2013 |
| DE | 102011081803 A1 | 2/2013 |
| DE | 102011081804 A1 | 2/2013 |
| EP | 1521148 A1 | 4/2005 |

OTHER PUBLICATIONS

German Office Action for related German Application No. 10 2013 205 051.8, dated Nov. 22, 2013, with English Translation.
PCT International Search Report and Written Opinion of the International Searching Authority dated Aug. 11, 2014 for corresponding PCT/EP2014/054139.
Chinese Office Action for Chinese Patent Application No. 201480017164.3 dated Dec. 15, 2016.
Chinese Office Action for Chinese Application No. 201480017164.3, dated Jan. 19, 2018.

\* cited by examiner

UPDATING OF A DIGITAL DEVICE CERTIFICATE OF AN AUTOMATION DEVICE

This application is the National Stage of International Application No. PCT/EP2014/054139, filed Mar. 4, 2014, which claims benefit of German Patent Application No. DE 10 2013 205 051.8, filed Mar, 21, 2013. The entire contents of these documents are hereby incorporated herein by reference.

BACKGROUND

The present embodiments relate to updating a digital device certificate.

Security credentials, (e.g., digital certificates or a security token) are needed to be able to use security mechanisms. A security infrastructure provides such security credentials. Automation devices (e.g., intelligent field devices or control computers) in automation systems are increasingly using certificates for authentication or else to negotiate security parameters for protecting communication between automation devices or other authentication partners.

A digital certificate (e.g., according to X.509v3) is a data structure that is protected with a digital signature and ties a public key to certain attributes (e.g., name, country, organization) in a tamperproof manner. In practice, digital certificates are issued by a certification authority. For this purpose, a user transmits a request to the certification authority or a registration authority. The certificate request is usually protected by a password, by a cryptographic checksum, by a signature or the like, with the result that only the authorized user may request a certificate for himself.

DE 10 2011 081 804 A1 discloses a device certificate having device-specific configuration information. In addition to information for identifying the device such as the manufacturer, model, serial number, date of manufacture, model version, such a digital device certificate contains further information that depends on the configuration of the device. This information is, for example, information relating to the firmware version and/or relating to a configuration status with country-specific versions, for example, and/or relating to supported options and/or features. Information relating to at least one user-configurable configuration may also be included.

The configuration data may be associated with a device certificate in various ways. In one case, the configuration data may be explicitly coded in the device certificate. In another case, these data may be included in an attribute certificate that is tied to the device certificate. In a further case, the device certificate does not explicitly contain the configuration data but rather a reference to the configuration data.

When authenticating an automation device, a check is carried out in order to determine, for example, whether device-specific configuration data for the automation device contained or referenced in a corresponding device certificate corresponds to an expected device configuration. If this is not the case, communication with the automation device may be denied. When transmitting measurement data from a first automation device to a second automation device (e.g., when authenticating the first automation device) device-specific configuration data associated with the certificate may be evaluated, and the measurement data provided may be interpreted accordingly (e.g., a degree of accuracy may be assigned to the measurement data).

A wide variety of processes (e.g., activation of a device feature by the operating personnel or conversion of the country code) may result in a change in the configuration of the automation device. However, correct evaluation of the device-specific configuration data is then no longer possible.

SUMMARY AND DESCRIPTION

The scope of the present invention is defined solely by the appended claims and is not affected to any degree by the statements within this summary.

The present embodiments may obviate one or more pf the drawbacks or limitations in the related art. For example, a method, an automation device, and a system that may be used to easily track and manage configuration-specific security credentials, such as digital device certificates, in the event of a change in the device configuration are provided. This is intended to be easily possible, even for a large number of devices.

In the method according to the present embodiments for updating a digital device certificate of an automation device in an automation system, the automation device is authenticated with respect to an authentication partner using at least one device certificate. In this case, the device certificate is associated with device-specific configuration data relating to the automation device. After or in the event of a change in the configuration of the automation device, the automation device determines, according to the present embodiments, an updated device certificate having device-specific configuration data corresponding to the changed configuration of the automation device and then uses the updated device certificate for authentication.

This makes it possible to also communicate updated device-specific configuration data to the authentication partner. As a result of the configuration data transmitted or referenced in the certificate, the authentication partner may assume that the configuration data is actually available configuration data and may adapt a corresponding operating mode to the configuration of the automation device being authenticated, for example. If the current device configuration provides more accurate measurement data, for example, this information may be evaluated by the authentication partner and the reliability statement of the measurement data may be increased. However, the device-specific configuration delivered may also be used to provide reliable, tamperproof evidence of the device configuration used, or of the entire history of device configurations used.

In one embodiment of the method, the automation device has a plurality of predefined device certificates having different associated device-specific configuration data. The automation device then selects the device certificate having device-specific configuration data corresponding to the changed configuration of the automation device. This enables a very fast response of the automation device to a change in the configuration since the certificates that have already been predefined for different device configurations are already available in a predefined manner in the automation device. This also makes it possible to restrict the configuration of the automation device by allowing only configurations for which a device certificate having the corresponding device-specific configuration data is available.

In one embodiment, the automation device has an integrated issuing unit. The issuing unit issues a device certificate having device-specific configuration data corresponding to the changed configuration of the automation device.

This makes it possible to promptly create device certificates in a very variable manner for the wide variety of configurations.

In this case, the device certificate may be issued in any desired operating mode of the automation device. In the event of a change in the configuration, this allows this change in the configuration to be introduced into a new device certificate and the changed configuration to be communicated to the authentication partners without interrupting operation. This allows particularly high flexibility in the event of changed configurations.

An embodiment in which the device certificate is issued only in a manner coupled to a particular operating mode is also provided. This makes it possible to provide that a change in the configuration is activated at a stipulated time (e.g., during the process of starting the automation device), and a new device certificate is generated at the same time. Actions wrongly interpreted as a change in the configuration during operation, therefore, do not result in a possibly incorrect device certificate that would therefore be associated with incorrect configuration data.

In one embodiment of the method, the integrated issuing unit may only issue device certificates for the automation device in which the issuing unit is included. For this purpose, a key pair required for this may be directly tied to the automation device (e.g., using a fixed common name of the device in a root certificate).

In one embodiment, the issuing unit allocates at least one identical parameter (e.g., an identical common name) for each device certificate issued by the issuing unit. This has the advantage that the integrated issuing unit may be used only to a very limited extent for the improper issuing of further device certificates by an attacker. This may be achieved in a simple manner by restricted allocation of the parameters in the certificate. For example, the allocation of the identical common name is suitable since this is immediately associated with a specific automation device.

In one embodiment of the method, the automation device, in the event of a change in the configuration of the automation device, requests a device certificate having device-specific configuration data corresponding to the changed configuration of the automation device from an issuing unit that is not included in the automation device itself. This has the advantage that the automation device still has a simple construction, and a spatially separate issuing unit issues device certificates for a number of automation devices.

In one embodiment, a request message for requesting a device certificate is protected by a digital signature using a generic, non-configuration-specific device certificate and/or by a digital signature using a previous device certificate corresponding to the configuration used before the change in the configuration of the automation device. Alternatively or additionally, the request message may be protected by a device password. This achieves secure communication between the automation device and the issuing authority, during which the identity of the automation device and the configuration data are safeguarded.

In one embodiment, the device certificate used before the change in the configuration is revoked after a predefined device certificate having changed device-specific configuration data has been requested or while the predefined device certificate is being used. The automation device is therefore always uniquely identified by a single device certificate.

In one embodiment, the device certificate used before the change in the configuration may still be used for a predefined time for positive authentication after a predefined device certificate having changed device-specific configuration data has been requested or while the predefined device certificate is being used. This makes it possible, for example, to also operate the automation device with a new configuration as long as an updated device certificate has not yet been created. This is advantageous, for example, when an updated device certificate may be generated only in particular operating modes.

In one embodiment, the plurality of predefined device certificates or the device certificates issued in the event of a change in the configuration of the automation device have a different device key or a different device key pair in each case. In another embodiment, the plurality of predefined device certificates or the device certificates issued in the event of a change in the device configuration each have the same device key or the same device key pair. Different device keys or device key pairs in each case increase the reliability of the certificate or require a greater amount of effort to manipulate the certificate. A device certificate having the same key or same device key pair is issued by a less complex issuing authority and with a shorter issuing duration.

In one embodiment of the method, the automation device creates an item of attestation information for confirming the changed device-specific configuration data and transmits the item of attestation information to the issuing unit. The attestation information confirms the authenticity of the configuration and constitutes a higher degree of security of the transmitted genetically specific configuration data and may be used for a higher security classification of the message or the device.

In another embodiment of the method, a regular operating mode of the automation device is activated only when a device certificate corresponding to the changed configuration of the automation device is available to the automation device. This makes it possible to provide that the automation device is operated only in the expected configuration. A configuration of the automation device that is operated without a corresponding device certificate is not possible.

The automation device according to the present embodiments in an automation system contains at least one device certificate. The automation device is authenticated with respect to an authentication partner using the device certificate associated with device-specific configuration data relating to the automation device. In this case, the automation device is configured such that the automation device, in the event of or after a change in the configuration, automatically determines a device certificate having device-specific configuration data corresponding to the changed configuration of the automation device and then uses the device certificate for authentication.

In one embodiment of the automation device, the automation device has a plurality of predefined device certificates having different device-specific configuration data.

In one embodiment of the automation device, the issuing unit and a control unit, for controlling the operation of the automation device, are included on a separate memory unit in each case, and the separate memory units are connected using a separation unit.

The system according to the present embodiments for updating a digital device certificate includes at least one automation device and at least one issuing unit. The automation device has at least one device certificate and is authenticated with respect to an authentication partner using the device certificate that contains device-specific configuration data relating to the automation device. The automation device is configured in such that the automation device, in the event of a change in the configuration of the automation device, automatically determines a device certificate having device-specific configuration data corresponding to the changed configuration of the automation device and then uses the device certificate for authentication. The at least one issuing unit is set up to issue a device certificate having device-specific configuration data corresponding to the changed configuration of the automation device.

BREIF DESCRIPTION OF THE DRAWINGS

DETAILED DESCRIPTION

Parts that correspond to one another are provided with same reference symbols in all figures.

Figure 1:
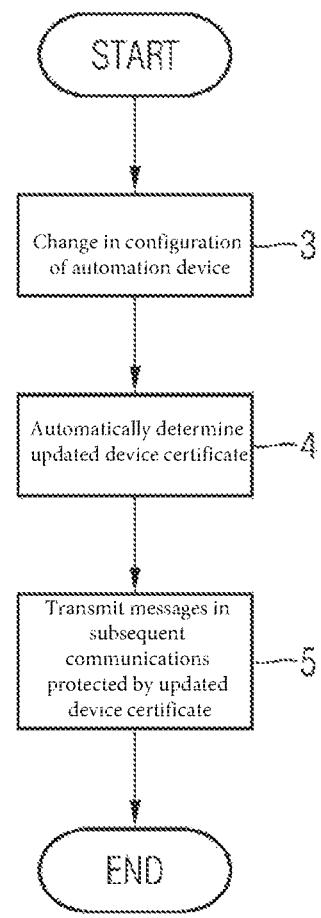
FIG. 1 shows a first exemplary embodiment of A method in the form of a flowchart.

FIG. 1 shows a general sequence 1 of updating a digital device certificate in an automation device. The sequence begins in method act 3 with a change in the configuration of the automation device. Such a change in a configuration may be effected, for example, by a firmware exchange, a feature activation or the activation of a country code, by which a country-specific operating mode is selected. Changes in the configuration of a user-definable configuration or a user-definable security configuration are likewise possible. A change in the configuration is also caused, for example, by resetting to an initial state. A change in the configuration is also possible using non-user-definable configurations initiated by a manufacturer or a service employee, for example.

If the automation device determines such a change in the configuration, the automation device automatically determines an updated device certificate including the device-specific configuration data corresponding to the changed configuration in method act 4. During subsequent communication with other automation devices or other authentication partners (see method act 5), for example, messages are transmitted in a manner protected by the updated device certificate. Updated device certificates may be determined and used based on the current configuration. A seamless sequence of the device configurations used may therefore be understood without interruption as far as the original configuration of the automation device using the chain of certificates and may be provided for further evaluation.

Figure 2:
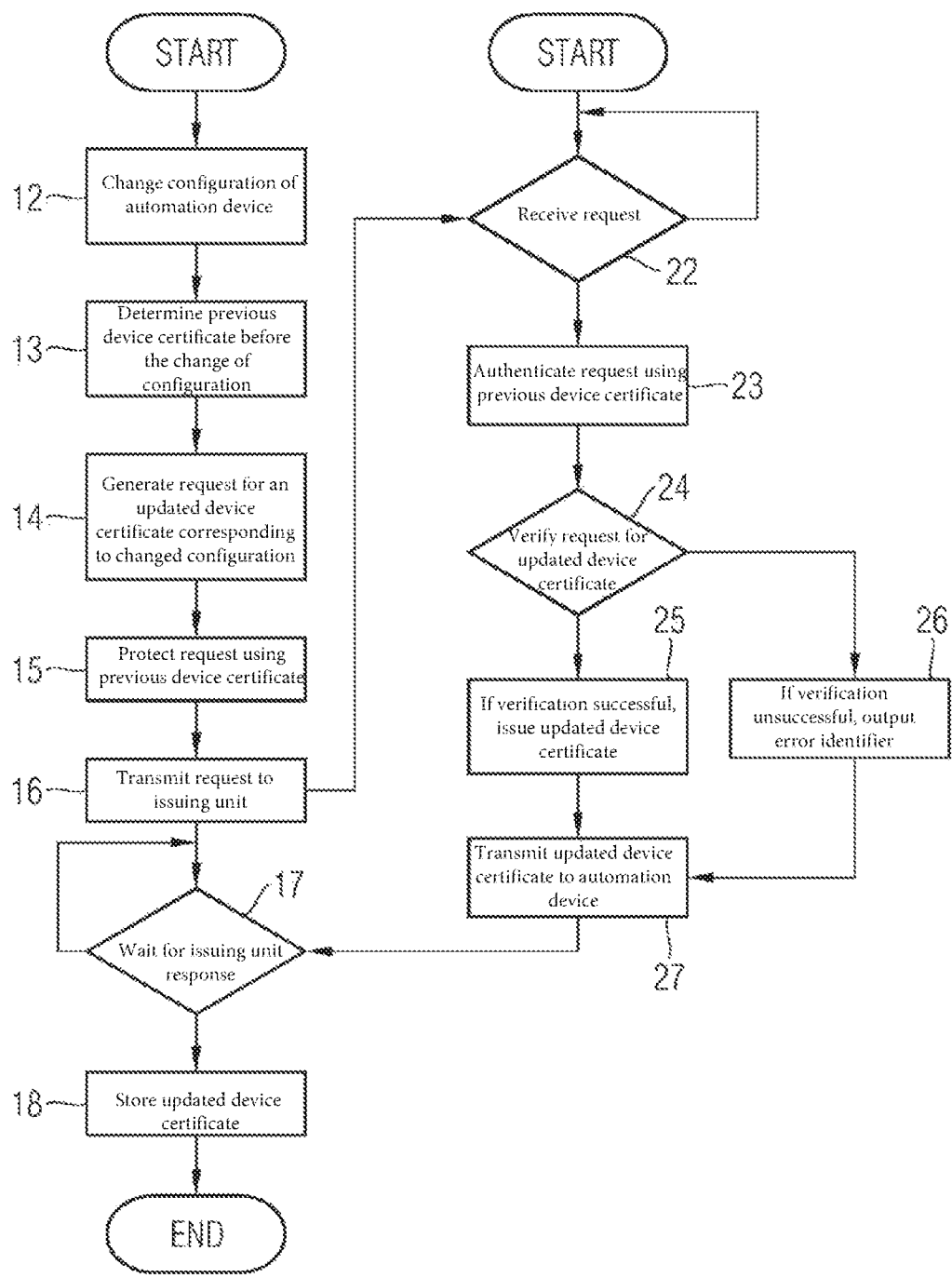
FIG. 2 shows a second exemplary embodiment of the method with the inclusion of an issuing unit in the form of a flowchart.

FIG. 2 shows a sequence 10 for determining an updated device certificate using an issuing unit for certificates that operates, for example, as a certification authority in a security infrastructure with public keys (PKI security infrastructure). In this case, an updated device certificate is requested from an issuing unit by generating a request message. In this case, the request message is protected, for example, by a previous device certificate associated with device-specific configuration data relating to the automation device before the change in the configuration.

The issuing unit may include the role of a registration and certification authority of a PKI security infrastructure. In this case, the sequence 10 applies both to an issuing unit integrated in the automation device and to a spatially remote embodiment. The issuing unit includes the function of a registration authority that receives and checks a request and the function of a certification authority that issues a digital device certificate. Both functions may likewise be formed in separate units either in a manner integrated in the automation device or as separate units of a public key infrastructure. The method acts carried out in the issuing unit are illustrated on the right-hand side, and the method acts carried out in the automation device are illustrated on the left-hand side in FIG. 2.

In method act 12, the configuration of the automation device is changed. In act 13, the previous device certificate that contains or references device-specific configuration data relating to the automation device before the change is determined. The automation device then generates a request message that is used to request an updated device certificate having device-specific configuration data corresponding to the changed configuration (see method act 14).

In act 15, the request message is now protected by the previous device certificate and is transmitted to the issuing unit in act 16.

In act 22, the request message is received in the issuing unit. The request message is authenticated by the previous device certificate known to the issuing unit in act 23. The request message is verified for the updated device certificate in act 24. If the verification is successful, the issuing unit issues an updated device certificate with the aid of authentication credentials of the issuing unit. The updated device certificate is transmitted to the automation device in act 27 and is stored there in act 18. If the request message for the updated device certificate could not be successfully verified, an error identifier is output in act 26 and is transmitted to the automation device. The updating sequence is therefore concluded.

In one exemplary embodiment, the previous device certificate is revoked if an updated device certificate is requested or used. As a further option, the previous device certificate corresponding to the unchanged configuration may still remain valid for a predefined time even after an updated device certificate has been issued and may result in positive authentication. In this case, the previous device certificate may remain valid, for example, for a subset of the authentication partners or else for a subset of intended purposes.

The plurality of previous or updated device certificates may each have the same device key or the same device key pair. However, it is likewise possible for the plurality of previous or updated device certificates to each have different device keys or different device key pairs.

Figure 3:
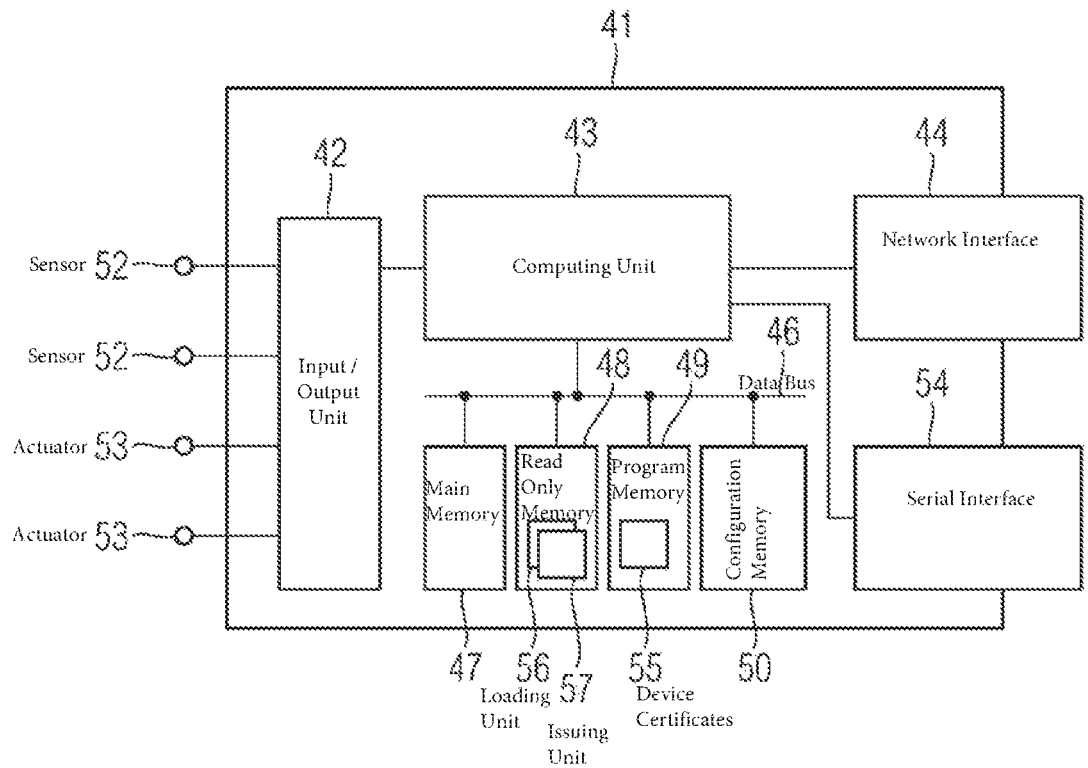
FIG. 3 shows a schematic illustration of an exemplary embodiment of an automation device.

FIG. 3 now shows an exemplary embodiment of an automation device 41. The automation device 41 includes, for example, a computing unit 43 and an input/output unit 42, to which sensors 52 and actuators 53, for example, are connected. The computing unit 43 accesses a main memory 47, a read-only memory 48, a program memory 49, and a configuration memory 50 via a data bus 46. The automation device may be connected to a data network, that is based on the Internet protocol for example, via a network interface 44. A serial interface 54, for example, is also present.

Configuration settings of the device are stored, for example, in the configuration memory 50. Program code is stored in the program memory 49. Configuration settings may be locally changed via the local interface 54 or via a network connection via the network interface 44.

The automation device 41 contains a configuration-dependent device certificate 55 having device-specific configuration data. The automation device 41 uses the certificate to be authenticated with respect to an authentication server, for example, via a network connection or to transmit measured values to a recording server or other automation devices in the automation system.

In one exemplary embodiment, a plurality of predefined configuration-specific device certificates 55 are present on the automation device 41 and are stored in the program memory 49, for example. Depending on the current device configuration stored in the configuration memory 50, for example, the device certificate 55 corresponding to the configuration is selected and is used for communication with other automation devices or authentication partners.

This exemplary embodiment has the advantage that a plurality of product variants of the automation device that differ only in terms of software, for example, may be produced in an identical manner. During production, device certificates 55 already predefined by the manufacturer are created for all possible product variants and are provided on the device. It is possible (e.g., only when delivering or installing the automation device) to stipulate a configuration of the device without first having to generate and install a corresponding device certificate. This is advantageous since the device configuration therefore need not be selected in a specially protected environment.

In another exemplary embodiment, the automation device 41 includes, for example, a loading unit that is included in the read-only memory 48. The loading unit 56 may partially or completely overwrite the program memory 49. For this purpose, booting is to be carried out in a special program memory change mode when starting the device. Depending on the installed program configuration, the loading unit 56 may now issue a device certificate 55 containing information relating to the program configuration (e.g., the version). This device certificate 55 having device-specific configuration data is written, for example, to the program memory 49 (see FIG. 3) or to the configuration memory 50.

The loading unit 56 has access to a private key of an issuing unit 57 that is likewise included in the read-only memory 48, for example. This key is used to create a signature for the device certificate.

The loading unit 56 checks, for example, the program configuration to be loaded before the program configuration is loaded or activated. This check is carried out, for example, by verifying a cryptographic checksum (e.g., SHA-1, SHA-256 or else HMAC-SHA1 or HMAC-SHA256) or a digital signature (e.g., RSA or DSA or ECDSA) of the configuration program.

The keys of the issuing unit 57 may be directly tied to the identity of the automation device 41. For this purpose, the common name of the device certificate 55 from the issuing unit 56 may contain specific information relating to the automation device 41, (e.g., its serial number). An issuer of the certificate from the issuing unit 57 may be the manufacturer of the automation device 41, for example. It is likewise possible for the certificate from the issuing unit 57 to be replaced with a special certificate from an operator.

This exemplary embodiment has the advantage that only the loading unit 56 requires access to the private key of the issuing unit 57. It is likewise advantageous that the configuration program need not be specifically generated and provided for an individual automation device 41 since a general configuration program may be used in an identical manner for a plurality of automation devices 41. Each automation device 41 then itself determines the corresponding device certificate 55 specific to the automation device and the appropriate device certificate 55 for the installed configuration program version.

Figure 4:
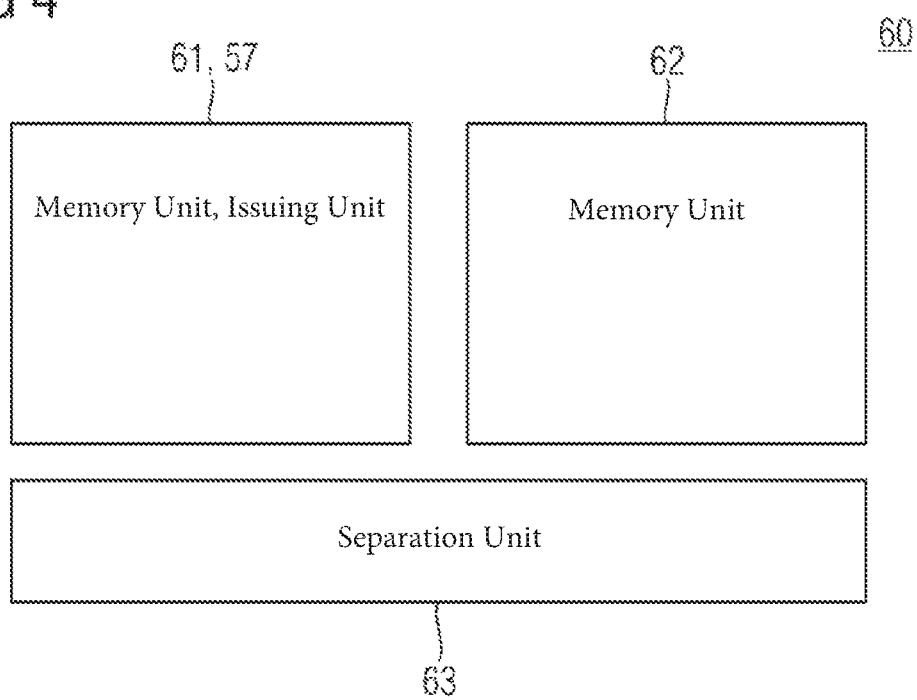
FIG. 4 shows a schematic illustration of an exemplary embodiment of an automation device having an integrated issuing unit on a separate memory unit.

In another embodiment (illustrated in FIG. 4), the automation device 41 has a memory 60 having memory units 61, 62 and a separation unit 63. The memory unit 61 includes functions or program units for regular operation of the automation device 41, and the issuing unit 57 for issuing a device certificate 55 having device-specific configuration data is included in the memory unit 62. Further memory units may be present in order to separate real-time functions or non-real-time functions from one another, for example. In this case too, the key of the issuing unit 57 may be directly tied to the identity of the automation device 41. For this purpose, the common name of the certificate from the issuing unit 57 may contain specific information relating to the automation device 41, (e.g., a serial number). The issuer of the certificate from the issuing unit may be, for example, the device manufacturer or an operator of the automation device 41 or the automation system.

This embodiment has the advantage that the separation unit 63 provides logical software partitions that are separate from one another and are in the form of the separate memory units 61, 62. This provides that the memory unit 62 having functions for controlling the operation of the automation device 41 cannot access a private key of the issuing unit 57 included in the memory unit 61.

Figure 5:
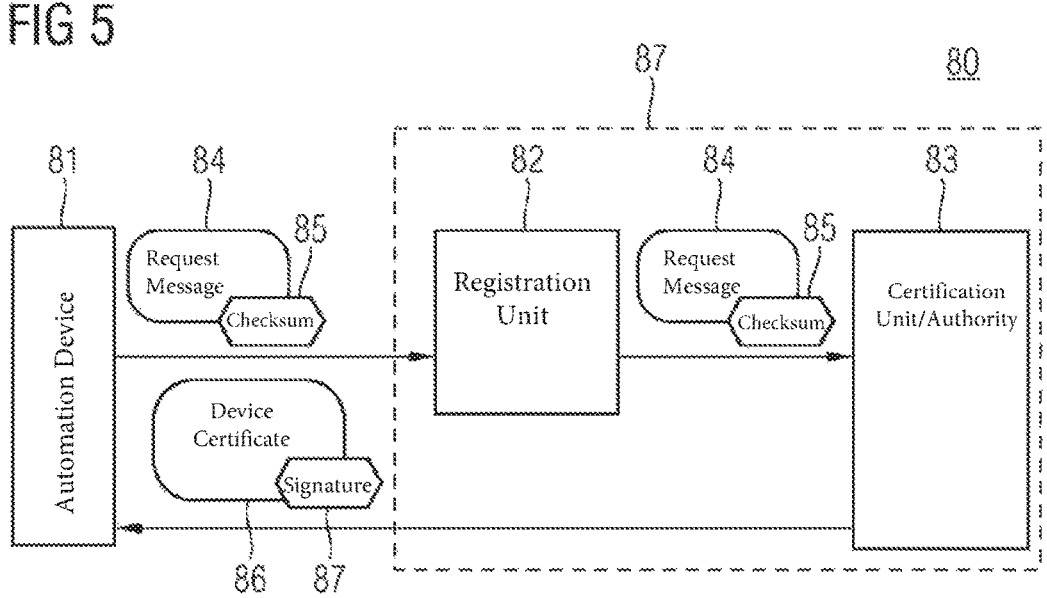
FIG. 5 shows a schematic illustration of a first exemplary embodiment of a request for a device certificate from an issuing unit not included in the automation device.

FIG. 5 shows another embodiment 80 of the method, in which the issuing unit 87 is in the form of an independent registration unit 82 and a separate certification unit 83 and is not integrated in the automation device 81. If a change in the configuration is determined in the automation device 81, the automation device 81 requests an updated device certificate from the issuing unit 87 using a request message 84. The request message 84 contains the name of the automation device, the current, (e.g., changed) device-specific configuration data, and a public key.

The request message 84 may be protected using a checksum 85, for example. The registration unit 82 receives the request message, checks the request message, and forwards the request message to the certification authority 83. After the request message 84 has been received, the certification authority 83 issues a corresponding device certificate 86 and transmits the corresponding device certificate 86 back to the automation device 81. In this case, the certificate 86 is protected by a signature 87 of the certification authority 83.

In this embodiment, the previous device certificate corresponding to the unchanged device configurations may be automatically revoked. For this purpose, the automation device 81 issues a revoke request and transmits this request to the certification authority 83. In one embodiment, the certification authority 83 or the issuing unit 87, which includes both the registration authority and the certification authority, automatically revokes the previous device certificate.

Figure 6:
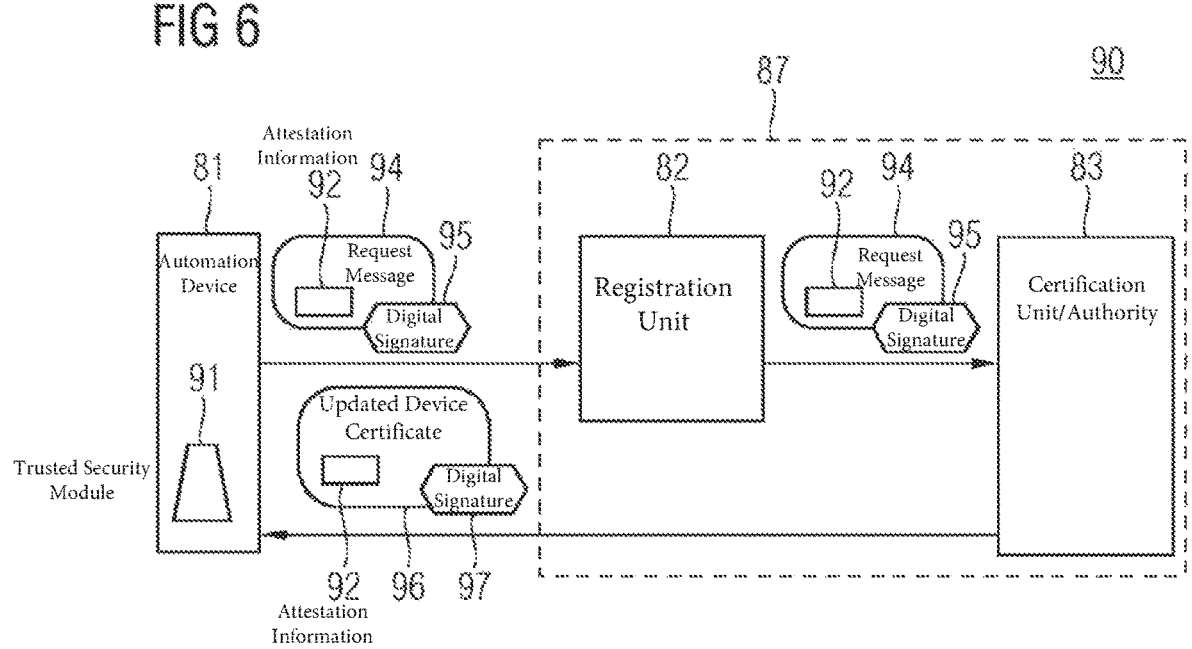
FIG. 6 shows a schematic illustration of a second exemplary embodiment according to the invention of a request for a device certificate with attestation information.

FIG. 6 shows another embodiment 90 of the method for updating a digital device certificate having device-specific configuration data, in which the automation device 81 contains a trusted security module 91. The trusted security module 91 checks the changed program configuration and creates an item of attestation information 92 that is inserted into the request message 84 as further proof of authenticity. The request message 94 is again protected, for example, by a digital signature 95 using a generic, non-configurationspecific device certificate or by a digital signature 95 using a previous device certificate or by a device password. The attestation information 92 is a further, additional security feature, with the result that a higher-ranking security level is certified for the automation device 81.

The issuing unit 87 or the certification authority 83 may only check the attestation information 92 and transmit an updated device certificate 96 back to the automation device 81 without registering the attestation information 92. Alternatively, the attestation information 92 may be entered in the certificate 96. For transmission, the certificate 96 is protected by a digital signature 97 using a generic, non-configuration-specific device certificate and/or by a digital signature using a previous device certificate and/or by a device password.

All of the features described and/or depicted may be advantageously combined with one another within the scope of the invention. The invention is not restricted to the exemplary embodiments described.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefor intended that the foregoing description be regarded as illustrative rather than limiting, and that it be understood that all equivalents and/or combinations of embodiments are intended to be included in this description.

The invention claimed is:

1. A method for updating a digital device certificate of an automation device in an automation system, the method comprising:
    authenticating the automation device with respect to an authentication partner using at least one device certificate, the at least one device certificate being associated with device-specific configuration data relating to the automation device, the authenticating comprising automatically determining, by the automation device, in the event of or after a change in a configuration of the automation device, an updated device certificate having device-specific configuration data corresponding to the changed configuration of the automation device, and using the updated device certificate for authentication,
    wherein the automation device comprises a plurality of predefined device certificates for determining the updated device certificate, the plurality of predefined device certificates having different device-specific configuration data corresponding to a respective plurality of changed configurations of the automation device, the plurality of predefined device certificates being predefined and stored on the automation device prior to any change in the configuration of the automation device, wherein determining the updated device certificate comprises selecting a device certificate having device-specific configuration data corresponding to the changed configuration of the automation device from the plurality of predefined device certificates having different device-specific configuration data.

2. The method of claim 1, wherein the automation device comprises an integrated issuing unit, and
    wherein determining the updated device certificate having device-specific configuration data corresponding to the changed configuration of the automation device comprises issuing, by the integrated issuing unit, the updated device certificate having device-specific configuration data corresponding to the changed configuration of the automation device.

3. The method of claim 2, wherein the updated device certificate is issuable in any desired operating mode.

4. The method of claim 2, wherein the updated device certificate is only issuable in a manner coupled to a particular operating mode.

5. The method of claim 2, wherein the issuing unit is operable to issue device certificates for only the automation device in which the integrated issuing unit is included.

6. The method of claim 5, further comprising allocating, by the integrated issuing unit, at least one identical parameter for each device certificate issued by the integrated issuing unit.

7. The method of claim 2, further comprising:
    creating, by the automation device, an item of attestation information for confirming the changed device-specific configuration data; and
    transmitting the item of attestation information to the integrated issuing unit.

8. The method of claim 1, wherein the determining comprises requesting, by the automation device, in the event of a change in the configuration of the automation device, a device certificate having device-specific configuration data corresponding to the changed configuration of the automation device from an issuing unit that is not included in the automation device.

9. The method of claim 1, wherein a request message for requesting a device certificate having device-specific configuration data corresponding to the changed configuration of the automation device is protected by a digital signature by a generic, non-configuration-specific device certificate, a digital signature by a previous device certificate corresponding to the configuration used before the change in the configuration of the automation device, a device password, or any combination thereof.

10. The method of claim 1, further comprising revoking the device certificate used before the change in the configuration of the automation device after the updated device certificate having changed device-specific configuration data has been determined.

11. The method of claim 1, wherein the device certificate used before the change in the configuration of the automation device is still useable for a predefined time at least for a subset of authentication partners or for at least one subset of intended purposes for positive authentication after the updated device certificate having changed device-specific configuration data has been determined.

12. The method of claim 1, wherein the plurality of device certificates or the updated device certificates issued in the event of a change in the configuration of the automation device have a different device key or a different device key pair in each case.

13. The method of claim 1, wherein the plurality of device certificates or the updated device certificates issued in the event of a change in the device configuration each have the same device key or the same device key pair.

14. The method of claim 1, wherein a regular operating mode of the automation device is activated only when an updated device certificate corresponding to the changed configuration of the automation device is available to the automation device.

15. The method of claim 1, wherein the device certificate corresponding to an unchanged configuration is usable for a predefined time for positive authentication after a change in the configuration of the automation device.

16. An automation device in an automation system for updating a digital device certificate, the automation device comprising:
　　at least one device certificate; and
　　a computing unit configured to access a program memory,
　　wherein device-specific configuration data and the at least one device certificate are stored in the program memory,
　　wherein the automation device is authenticated with respect to an authentication partner using a device certificate associated with device-specific configuration data relating to the automation device,
　　wherein the automation device is configured such that the automation device, in the event of or after a change in the configuration of the automation device, automatically accesses an updated device certificate having device-specific configuration data corresponding to the changed configuration of the automation device and then uses the updated device certificate having device-specific configuration data corresponding to the changed configuration of the automation device for authentication, and
　　wherein the automatic access of the updated device certificate comprises access, by the automation device, of the updated device certificate from a plurality of predefined device certificates having different device-specific configuration data corresponding to a respective plurality of changed configurations of the automation device, the plurality of predefined device certificates being predefined and stored on the automation device prior to any change in the configuration of the automation device.

17. The automation device of claim 16, wherein an issuing unit is integrated in the automation device, and an issuing unit and a control unit, for controlling operation of the automation device, are included on a separate memory unit in each case, the separate memory units being connected by a separation unit.

18. A system for updating a digital device certificate of an automation device in an automation system, the system comprising:
　　at least one automation device and at least one issuing unit, the at least one automation device having at least one device certificate and being authenticated with respect to an authentication partner using the at least one device certificate, which is associated with device-specific configuration data relating to the at least one automation device, the at least one automation device being configured such that the at least one automation device, in the event of a change in the configuration of the at least one automation device, automatically determines an updated device certificate having device-specific configuration data corresponding to the changed configuration of the at least one automation device and then uses the updated device certificate having device-specific configuration data corresponding to the changed configuration of the at least one automation device for authentication,
　　wherein the at least one issuing unit is configured to issue the updated device certificate having device-specific configuration data corresponding to the changed configuration of the at least one automation device, and
　　wherein the automatic determination of the updated device certificate comprises selection, by the at least one automation device, of the updated device certificate from a plurality of predefined device certificates having different device-specific configuration data corresponding to a respective plurality of changed configurations of the at least one automation device, the plurality of predefined device certificates being predefined and stored on the at least one automation device prior to any change in the configuration of the at least one automation device.

\* \* \* \* \*